(12) United States Patent
Ehrsam et al.

(10) Patent No.: US 7,020,098 B2
(45) Date of Patent: Mar. 28, 2006

(54) PREDICTIVE RESERVATION OF A COMMUNICATION LINK FOR A PACKET-BASED REAL-TIME MEDIA SESSION

(75) Inventors: John D. Ehrsam, Prairie Village, KS (US); Tony A. Stewart, Shawnee Mission, KS (US); Benjamin P. Blinn, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 173 days.

(21) Appl. No.: 10/446,586

(22) Filed: May 28, 2003

(65) Prior Publication Data

US 2004/0240407 A1 Dec. 2, 2004

(51) Int. Cl.
*H04L 12/16* (2006.01)
*H04J 9/00* (2006.01)

(52) U.S. Cl. .................. 370/260; 379/205.01; 709/204
(58) Field of Classification Search ........ 370/260–263, 370/315, 352, 389, 392, 401; 455/458, 519; 709/88.11, 205.01, 203, 204; 379/88.11, 379/205, 205.01
See application file for complete search history.

(56) References Cited

U.S. PATENT DOCUMENTS

| 4,870,408 | A | 9/1989 | Zdunek et al. |
|---|---|---|---|
| 5,442,809 | A | 8/1995 | Diaz et al. |
| 5,568,511 | A | 10/1996 | Lampe |
| 5,710,591 | A | 1/1998 | Bruno et al. |
| 5,818,836 | A | 10/1998 | DuVal |
| 5,850,611 | A | 12/1998 | Krebs |
| 5,884,196 | A | 3/1999 | Lekven et al. |
| 5,936,964 | A | 8/1999 | Valko et al. |
| 5,983,099 | A | 11/1999 | Yao et al. |
| 6,014,556 | A | 1/2000 | Bhatia et al. |
| 6,032,051 | A | 2/2000 | Hall et al. |
| 6,041,241 | A | 3/2000 | Willey |
| 6,119,017 | A | 9/2000 | Cassidy et al. |
| 6,178,323 | B1 | 1/2001 | Nagata |
| 6,381,467 | B1 | 4/2002 | Hill et al. |
| 6,490,452 | B1 | 12/2002 | Boscovic et al. |
| 6,526,377 | B1 | 2/2003 | Bubb |
| 2002/0055364 | A1 | 5/2002 | Wang et al. |
| 2002/0069248 | A1* | 6/2002 | King et al. .................. 709/204 |
| 2002/0071445 | A1 | 6/2002 | Wu et al. |

(Continued)

FOREIGN PATENT DOCUMENTS

EP 0 817 457 1/1998

(Continued)

OTHER PUBLICATIONS

International Search Report from International Application No. PCT/US02/31411, dated Mar. 4, 2003.

(Continued)

*Primary Examiner*—Afsar Qureshi

(57) ABSTRACT

A method and system for reducing latency in establishment of a real-time communication session, such as an instant chat session for instance. The method and system provides for detecting the occurrence of a triggering event that indicates a user is likely to soon request initiation of a real-time media session, before the user actually makes the request. In response to detection of the triggering event, the method and system then provides for reserving a data connection through which the session can be set up and carried and maintaining that data connection for a certain period of time. Thereafter, if and when the user actually requests initiation of a session, a data connection will already exist, or procedures will have already begun to establish the data connection.

24 Claims, 6 Drawing Sheets

U.S. PATENT DOCUMENTS

| | | | |
|---|---|---|---|
| 2002/0145990 | A1 | 10/2002 | Sayeedi |
| 2002/0147818 | A1 | 10/2002 | Wengrovitz |
| 2002/0172165 | A1 | 11/2002 | Rosen et al. |
| 2002/0172169 | A1 | 11/2002 | Rosen et al. |
| 2002/0173325 | A1 | 11/2002 | Rosen et al. |
| 2002/0173326 | A1 | 11/2002 | Rosen et al. |
| 2002/0173327 | A1 | 11/2002 | Rosen et al. |
| 2002/0177461 | A1 | 11/2002 | Rosen et al. |
| 2002/0191583 | A1 | 12/2002 | Harris et al. |
| 2003/0008657 | A1 | 1/2003 | Rosen et al. |
| 2003/0021264 | A1 | 1/2003 | Zhakov et al. |
| 2003/0114156 | A1* | 6/2003 | Kinnavy ............. 455/434 |
| 2003/0190888 | A1* | 10/2003 | Mangal et al. ......... 455/3.05 |

FOREIGN PATENT DOCUMENTS

| | | |
|---|---|---|
| EP | 0 984 608 | 3/2000 |

OTHER PUBLICATIONS

International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
International Search Report from International Application No. PCT/US03/02950, dated Nov. 6, 2003.
U.S. Appl. No. 10/277,465, filed Oct. 22, 2002 entitled "Method for Call Setup Using Short Data Bursts".
U.S. Appl. No. 10/067,028, filed Feb. 4, 2002 entitled "Method and System for Reducing Latency When Initiating Real-Time Media Sessions".
3$^{rd}$ Generation Partnership Project 2 "3GPP2", Fast Call Set-Up, Version 1.0, Apr. 15, 2002.
Mobile Tornado, http://www.mobiletornado.com/products_iprsptt.html, printed from the World Wide Web on Jan. 27, 2003.
"Qualcomm Chats Up 'Push-to-Talk'," http://siliconvalley.internet.com/news/print.php/953261, printed from the World Wide Web on Jan. 27, 2003.
Schulzrinne and Rosenberg, "SIP Caller Preferences and Callee Capabilities," Internet Engineering Task Force, Internet Draft, Oct. 22, 1999.
Vakil et al., "Host Mobility Management Protocol Extending SIP to 3G-IP Networks," Internet Engineering Task Force, Internet Draft, Oct. 1999.
Campbell and Sparks, "Control of Service Context Using SIP Request—URI," Network Working Group, Apr. 2001.
Ericsson, www.telecomcorridor.com/wireless%20horizons/1Coyne.pdf, printed from the World Wide Web on Jun. 27, 2001.
Dirk Kutscher/Jorg Ott, "The Message Bus—A Communication & Integration Infrastructure for Component-Based Systems," White Paper, Jan. 2000.
Ott et al., "A Message Bus for Local Coordination," Network Working Group, Internet-Draft, May 30, 2001.
TR45, Medium Access Control (MAC) Standard for cdma2000 Spread Spectrum Systesm, IS-2000-3, Jul. 12, 1999.
3$^{rd}$ Generation Partnership Project 2 'GPP2', "Interoperability Specification (IOS) for CDMA 2000 Access Network Interfaces—Part 3 Features," Nov. 2001.
Perkins, "IP Mobility Support," Internet Engineering Task Force Request for Comment 2002, Oct. 1996.
Perkins, "IP Encapsulation within IP," Internet Engineering Task force Request for Comments 2003, Oct. 1996.
Perkins, "Minimal Encapsulation with in IP," Internet Engineering Task Force Request for Comments 2004, Oct. 1996.
Solomon, "Applicability Statement for IP Mobility Support," Internet Engineering Task Force Request for Comments 2005, Oct. 1996.
Handley et al., "SDP: Session Description Protocol," Internet Engineering Task Force Request for Comment 2327, Apr. 1998.
Handley et al., "SIP: Session Initiation Protocol," Internet Engineering Task Force Request for Comment 2543, Mar. 1999.
Fielding et al., "Hypertext Transfer Protocol—HTTP/1.1," Internet Engineering Task force Request for Comment 2616, Jun. 1999.
Rigney et al., "Remote Authentication Dial in User Service (RADIUS)," Internet Engineering Task Force Request for Comment 2865, Jun. 2000.
Rigney, "RADIUS Accounting," Internet Engineering Task Force Request for Comment 2866, Jun. 2000.
OMA, Discussion and definitions on PoC Floor Control, Input Contribution, Doc #OMA-REQ-2003-0375-PoC_Floor_Control, Jun. 2, 2003.
OMA, "PoC Use case: Mobile—PC Example," Input Contribution, Doc #OMA-REQ-2003-0323 PoC Mobile-PC use case, May 5, 2003.
OMA, "PoC Use case: Multimedia Group Call Example," Input Contribution, Doc #OMA-REQ-2003-0306-PoC UseCase-group-multimedia-scenario, May 6, 2003.
OMA, "PoC Use case: Examples of User Requirements," Input Contribution, Doc #OMA-REQ-2003-0305-PoC Use Case, May 6, 2003.
OMA, "Inputs for PoC Requirements Document," Input Contribution, Doc #OMA-REQ-2003-0367-PoC_Input_Motorola, May 29, 2003.
OMA, "Push to Talk over Cellular (PoC)," Version: 0.1.6, May 12, 2003.
International Search Report from International Application No. PCT/US2003/02950, dated Jan. 30, 2003.
Office Action from U.S. Appl. No. 10/067,080, dated May 21, 2003.
Office Action from U.S. Appl. No. 10/067,080, dated Apr. 27, 2004.

* cited by examiner

PREDICTIVE RESERVATION OF A COMMUNICATION LINK FOR A PACKET-BASED REAL-TIME MEDIA SESSION

BACKGROUND

1. Field of the Invention

The present invention relates to network communications and, more particularly, to the establishment of packet-based real-time media sessions.

2. Description of Related Art

As a general matter, it is known to establish a real-time media conference over a packet-switched network between multiple user stations, each operated by a respective user. A communication server, such as a multipoint conference unit (MCU) for instance, can reside functionally in the network and can operate as a bridging or switching device between the participating stations, to support the conference session.

In practice, a participating station might initiate the conference session by sending to the communication server a session setup message that identifies the other desired participant(s). The server may then seek to connect each of the designated other participants, such as by forwarding the session setup message or sending a new session setup message to each other party. Ultimately, the server would thereby establish a conference leg with each participating station, including the initiating station, and the server would then bridge together the legs so that the users at the stations can confer with each other, exchanging voice, video and/or other media in real-time via the server.

A signaling mechanism such as the well known Session Initiation Protocol (SIP) could be used to initialize the conference and more particularly to set up each conference leg. Further, digitized media could be packetized and carried between each participating station according to a mechanism such as the well known Real-time Transport Protocol (RTP), for instance. The core industry standards for SIP (Internet Engineering Task Force (IETF) Request For Comments (RFC) 2543) and RTP (IETF RFC 1889) are hereby incorporated by reference.

Packet based media conferencing can be advantageously employed to provide an "instant connect" service, where a user of one station can readily initiate a real-time media conference with one or more designated target users at other stations. The initiating user may simply select a target user or group and then press an instant connect button on his or her station, and the user's station would responsively signal to a communication server to initiate a conference between the initiating user and the selected user or group. This sort of service is referred to as "instant connect" because it strives to provide a quick connection between two or more users, in contrast to telephone service where a user dials a telephone number of a party and waits for a circuit connection to be established with that party.

An example of an instant connect service is commonly known as "push-to-talk" (PTT). In a PTT system, some or all of the conference stations are likely to be wireless devices such as cellular mobile stations, that are equipped to establish wireless packet-data connectivity and to engage in voice-over-packet (VoP) communication. Alternatively, some or all of the stations could be other sorts of devices, such as multimedia personal computers or Ethernet-telephones, that can establish packet data connectivity and engage in VoP communication through landline connections. Further, each station could be equipped with a PTT button or other mechanism that a user can engage in order to initiate an PTT session or to request the floor during an ongoing session.

In practice, a user of a PTT-equipped mobile station might select a target user or group of users from a contact list or other program menu and engage the PTT button to initiate a conference session with that user or group. In response, the mobile station may then send a session initiation message to the communication server, to set up a conference session in the manner described above for instance, and the user could begin talking with the other users. Further, a similar mechanism could be applied to establish real-time media conferences carrying video or other media as well.

Ideally, a wireless instant-connect system should simulate instant 2-way radio communication. For instance, when a user initiates a PTT session, the user will want to be able to press the PTT button and immediately begin talking to each other party "on the channel." Unfortunately, however, communications in the wireless environment can result in unacceptable call setup latencies on the order of 6 or even 10 seconds.

In general, this setup latency may arise at the initiating end and/or at the target end(s), because the initiating mobile station and/or target mobile station may need to acquire data connections (radio links and data links) before communication begins. Further, additional delay can arise as the communication server works to set up communication with the endpoints.

At the initiating end, for example, if the mobile station is dormant (having a data link but no radio link), the mobile station may need to request a radio link traffic channel before it can begin communicating with the communication server, and the process of requesting and waiting for a channel assignment can take some time. Further, once the initiating mobile station has acquired a radio link and thus switched from a dormant state to an active state, the mobile station may send an initiation request such as a SIP "INVITE" to the server, and it may then take some time for the server to set up an RTP leg with each participating station. Still further, if the initiating mobile station does not currently have a data-link layer connection when a user seeks to initiate a PTT session, additional delay may result as the mobile station works to establish that connection.

In turn, for each target mobile station, a radio access network may receive a termination request, such as an INVITE message, that is to be delivered to the target mobile station. If the target mobile station is dormant, the radio access network would then page the target station and await a response. This paging process can be a large source of call-setup latency if paging is carried out at only periodic time slots on the paging channel. Further, once a dormant mobile station receives a page, it may then respond to the page by requesting a traffic channel, which could add more delay. Still further, once the terminating mobile station has acquired a traffic channel, it may then need to work with the communication server to establish a conference leg, which could take still more time.

SUMMARY

The present invention provides a mechanism for reducing the latency that occurs in the initiation of packet-based real-time media sessions. In accordance with an exemplary embodiment of the invention, an initiating station will detect a triggering event that indicates a user is likely to soon request initiation of a session, and the station will responsively reserve a data connection for use in setting up and carrying the session.

For example, an initiating mobile station could detect that a user is interacting with a real-time media application, such as opening or scrolling through a menu of target users or groups, without actually requesting session initiation. In response to the user's activity, the initiating mobile station may then begin acquiring a radio link and data link through which the mobile station can ultimately send a session initiation request. Further, the mobile station could thereafter maintain the radio link for a period of time by sending keep alive signals into the network.

Advantageously, if and when the user then requests initiation of a session, the mobile station may already have a data connection through which to send a session initiation request, or may already have begun acquiring the data connection. Thus, the time involved in acquiring a data connection to facilitate session initiation can be greatly reduced.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Overview of Packet-Based Real-Time Media Conferencing

Figure 1:
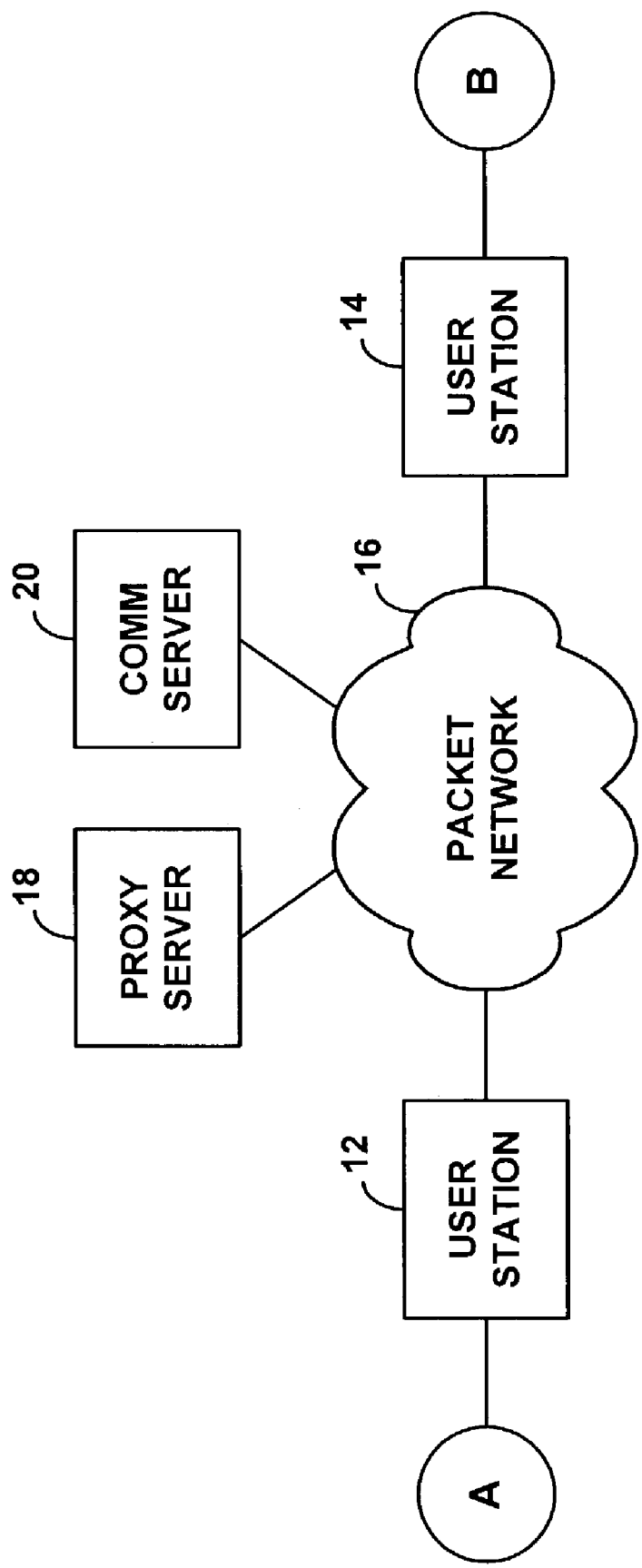
FIG. 1 is a block diagram of a communication system for carrying out packet-based real-time conferencing.

Referring to the drawings, FIG. 1 illustrates an exemplary communication system 10 arranged to provide packet-based real-time media conferencing. For simplicity, FIG. 1 depicts two user stations 12, 14, coupled with a common packet-switched network 16. User station 12 is operated by user A, and a user station 14 is operated by user B. Sitting on the packet network 16, by way of example, are then a proxy server 18 and a communication server 20.

It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

In the exemplary arrangement of FIG. 1, each user station 12, 14 is preferably equipped with hardware and logic to establish network connectivity and to set up and engage in packet-based real-time media sessions. To be able to establish network connectivity, for instance, each station may be equipped with a wireless or landline network interface module and logic to gain a data connection. To be able to set up a packet-based media session, each user station may then be programmed to engage in SIP signaling or other session initiation signaling. And to be able to communicate real-time media such as voice and/or video, each user station may be equipped with hardware to receive media from a user and to play out media to a user, as well as program logic to send and receive digital representations of the media according to RTP or another designated protocol.

Proxy server 18 may then be a signaling proxy that functions to forward or direct signaling messages from point to point through network 16. For instance, if SIP signaling is used, proxy server 18 could be a SIP proxy server.

Communication server 20, in turn, is also preferably equipped with hardware and logic to be able to set up media communications with each station and to bridge those communications together so as to allow users at the stations to communicate with each other. As such, communication server 20 may be programmed to engage in signaling communication according to SIP or another designated protocol, in order to set up a conference leg with each participating station. And communication server 20 may further be programmed to receive and send media streams according to RTP or another designated protocol.

Communication server 20 can be a discrete entity, such as an MCU. Alternatively, communication server 20 can comprise a number of components, such as (i) an MCU that bridges communications, and (ii) a controller that functions to set up and control conference legs through the MCU, using third party call control techniques, for instance. Other arrangements are also possible.

Figure 2:
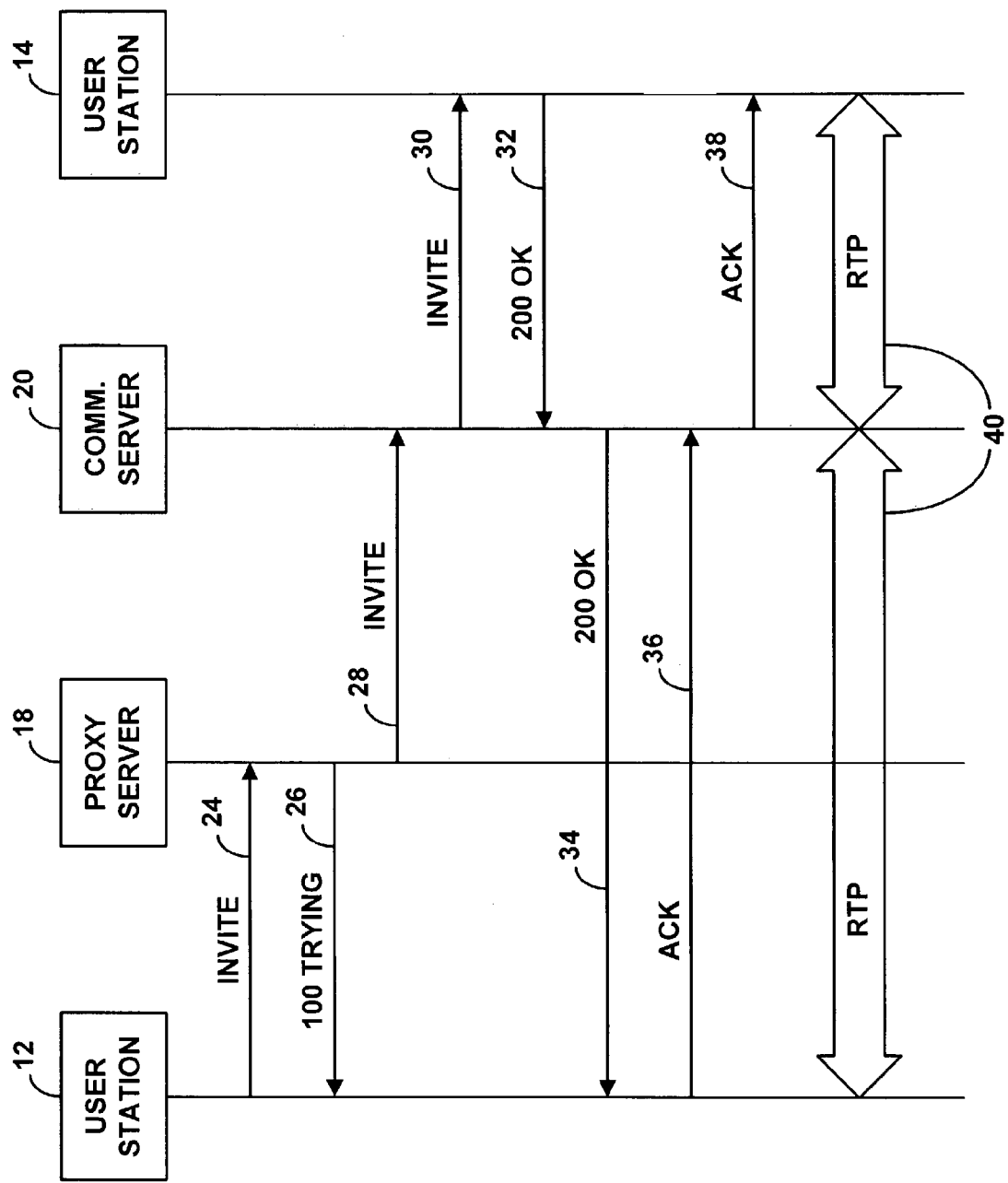
FIG. 2 is a message flow diagram showing an example of session setup signaling in the arrangement of FIG. 1.

FIG. 2 next depicts an exemplary method of setting up a packet-based real-time media conference session between users A and B in the arrangement of FIG. 1. As shown in FIG. 2, at step 24, in response to a request from user A to initiate a conference with user B, station 12 may initiate the conference by sending a SIP "INVITE" message to proxy server 18, destined to a predefined SIP address of communication server 20. The INVITE message may describe the type of session desired in accordance with the Session Description Protocol (SDP) and may designate user B as a target participant.

At step 26, after receiving the INVITE message, proxy server 18 then responds with a SIP "100 TRYING" message or other signal to acknowledge receipt of the INVITE message and to indicate that signaling is in process. Further, at step 28, proxy server 18 forwards the INVITE message to an IP address of the server 20 for handling.

Upon receipt of the INVITE message, at step 30, communication server 20 then sends an INVITE message to user B at user station 14, in an effort to set up a conference leg with user B. At step 32, upon receipt of the INVITE message, user station 14 responds with a SIP "200 OK" message indicating willingness to participate in the session. At step 34, communication server 20 then sends a 200 OK message to user station 12, similarly indicating willingness to participate in the session.

At step 36, user station 12 then responds to the communication server with a SIP "ACK" message, to complete set up of a conference leg between user station 12 and the server 20. And at step 38, the server similarly responds to user station 14 with an ACK message to complete set up of a conference leg between user station 14 and the server. At step 40, the server then engages in RTP communications with both user station 12 and user station 14 and bridges those communications together, so that users A and B can communicate with each other.

2. Example Instant-Connect System a. Network Architecture

Figure 3:
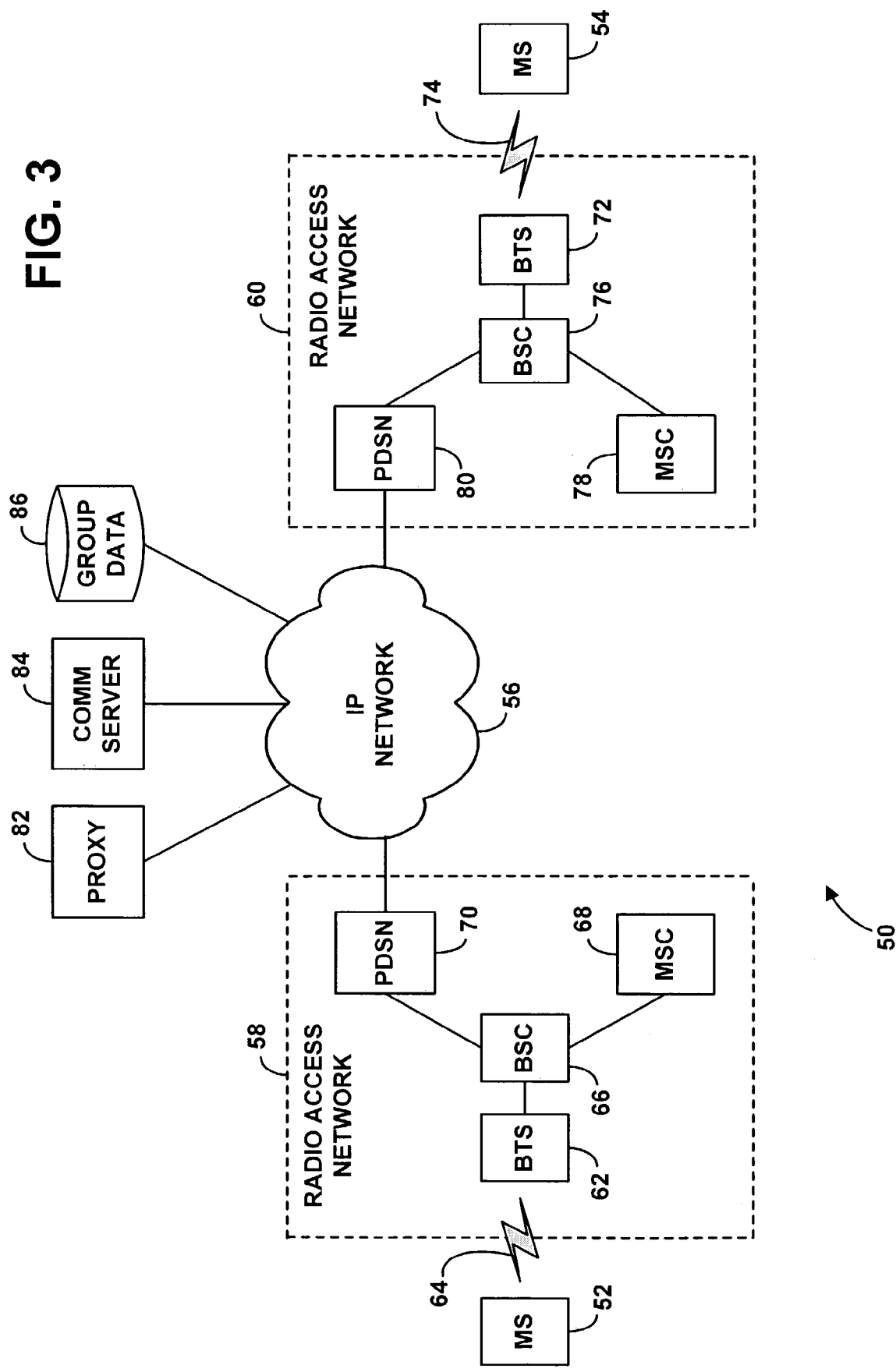
FIG. 3 is a block diagram of a wireless communication system in which an instant-connect service, such as push-to-talk, could be carried out.

As indicated above, real-time media conferencing such as that described in the preceding section can be employed to provide an instant-connect service, such as PTT service for instance. FIG. 3 illustrates an exemplary wireless communication system 50 in which such a service could be provided. It should be understood, however, that PTT or other instant connect service could be provided in other arrangements as well, whether wireless and/or landline.

Exemplary wireless communication system 50 includes a number of mobile stations, such as mobile stations 52 and 54 for instance. Each mobile station (MS) can be linked by a radio access network with an IP network 56. As shown by way of example, MS 52 is linked by a first radio access network 58 with the IP network, and MS 54 is linked by a second radio access network 60 with the IP network. Alternatively, both MS 52 and MS 54 can be linked with the IP network by a common radio access network. Other alternatives are possible as well.

Each radio access network provides wireless connectivity with the IP network and can take any of a variety of forms. By way of example, radio access network 58 may include a base transceiver station (BTS) 62 that can communicate with MS 52 over an air interface 64. BTS 62 may then be coupled with a base station controller (BSC) 66, which may in turn be coupled with a mobile switching center (MSC) 68 and with a packet data serving node (PDSN) 70 or other gateway to the IP network 56. (At times, a BTS and BSC in combination may be referred to as a "base station.") Similarly, radio access network 60 may include a BTS 72 that can communicate with MS 54 over an air interface 74. BTS 72 may then be coupled with a BSC 76, which may in turn be coupled with an MSC 78 and with a PDSN 80 or other gateway to the IP network 56.

As another example, either or both of the radio access networks could comprise a base station that itself functions as a gateway with the IP network, without use of a PDSN or other gateway to the network. And as another example, MS 52 and MS 54 could communicate at least in part via a common radio access network, such as through a common PDSN, a common BSC and/or a common BTS. Other examples are also possible.

As a general matter, in order for a mobile station such as mobile station 52 or 54 to engage in packet-based media conferencing, it would need to acquire both a radio link layer connection with its radio access network and a data link layer connection with the IP network 56. The manner in which the mobile station acquires these connections might vary depending on the protocol used for communication over the air interface. In the exemplary embodiment, for instance, each air interface may be a code division multiple access (CDMA) air interface, and communications between each mobile station and the radio access network may comply with an industry standard such as cdma2000, which is published by the 3rd Generation Partnership Project 2. However, the air interface could follow other protocols as well, such as TDMA, GSM or 802.11x for instance.

Under cdma2000, to establish a packet-data connection, a mobile station would send a packet-data origination request over a common air interface channel (such as a reverse link access channel) to the MSC and would include in the request a "packet data" service option code that indicates a desire to establish a packet-data connection. In response to the "packet data" service option code, the MSC may then send the request to the BSC for processing.

In turn, the BSC may then establish a radio link layer connection with the mobile station, by directing the mobile station to operate on a particular traffic channel over the air interface (e.g., a fundamental traffic channel, and perhaps one or more supplemental channels). In addition, the BSC may pass the initiation request to the PDSN, and the PDSN and mobile station may then negotiate with each other to establish a data-link layer connection, typically a point-to-point protocol (PPP) session, over which packet data can be communicated between the mobile station and the PDSN. Further, the PDSN may assign a mobile-IP address to the mobile station, which the mobile station can use as its network address for communicating with other entities on the packet-switched network.

In order to conserve air interface resources, the radio-link layer connection with the mobile station may be arranged to time-out after a predefined period of inactivity. For instance, after 10 seconds in which no data is communicated to or from the mobile station over the assigned traffic channel, the BSC might programmatically release the traffic channel, allowing the channel to be used by other mobile stations instead. At the same time, however, the data-link layer (e.g., PPP) connection with the mobile station might remain, so the mobile station may retain its IP address.

Once the radio-link layer connection with a mobile station has timed out, the mobile station will be considered "dormant." However, if its data-link layer connection still exists, the mobile station may still seek to send packet data to other entities, and other entities may seek to send packet data to the mobile station. When another entity seeks to send packet data to the mobile station, the BSC will page the mobile station over an air interface paging channel.

When a dormant mobile station receives a page indicative of an incoming data communication, or if the dormant mobile station seeks to send data, the radio link layer connection with the mobile station will need to be reestablished. To do so, the mobile station may send a message to the BSC over the access channel, requesting radio-link resources, and the BSC may then assign a traffic channel. The mobile station may then send or receive packet data over that traffic channel.

As further shown in FIG. 3, a number of other entities may be coupled with (or may sit as nodes on) IP network 56. These other entities may include a proxy server 82, a communication server 84, and a group data store 86. The proxy server 82 can be a SIP proxy server that functions to receive and forward SIP signaling messages, such as SIP INVITE requests. And the communication server 84 may be a PTT server that functions to establish and carry PTT sessions between MS 52 and MS 54 and/or between other stations (landline or wireless) linked with IP network 56. Group data store 86 may then define groups of subscribers set to communicate with each other.

These entities may be arranged in any of a variety of ways. For example, group data store 86 may reside on a discrete database server that is coupled with the IP network 56 and that is accessible by communication server 84. Or group data store 86 may reside within communication server 84 or proxy server 82. And as another example, the function of proxy server 82 may be integrated with the function of communication server 84. Other examples are also possible.

b. Example Component Architecture

Figure 4:
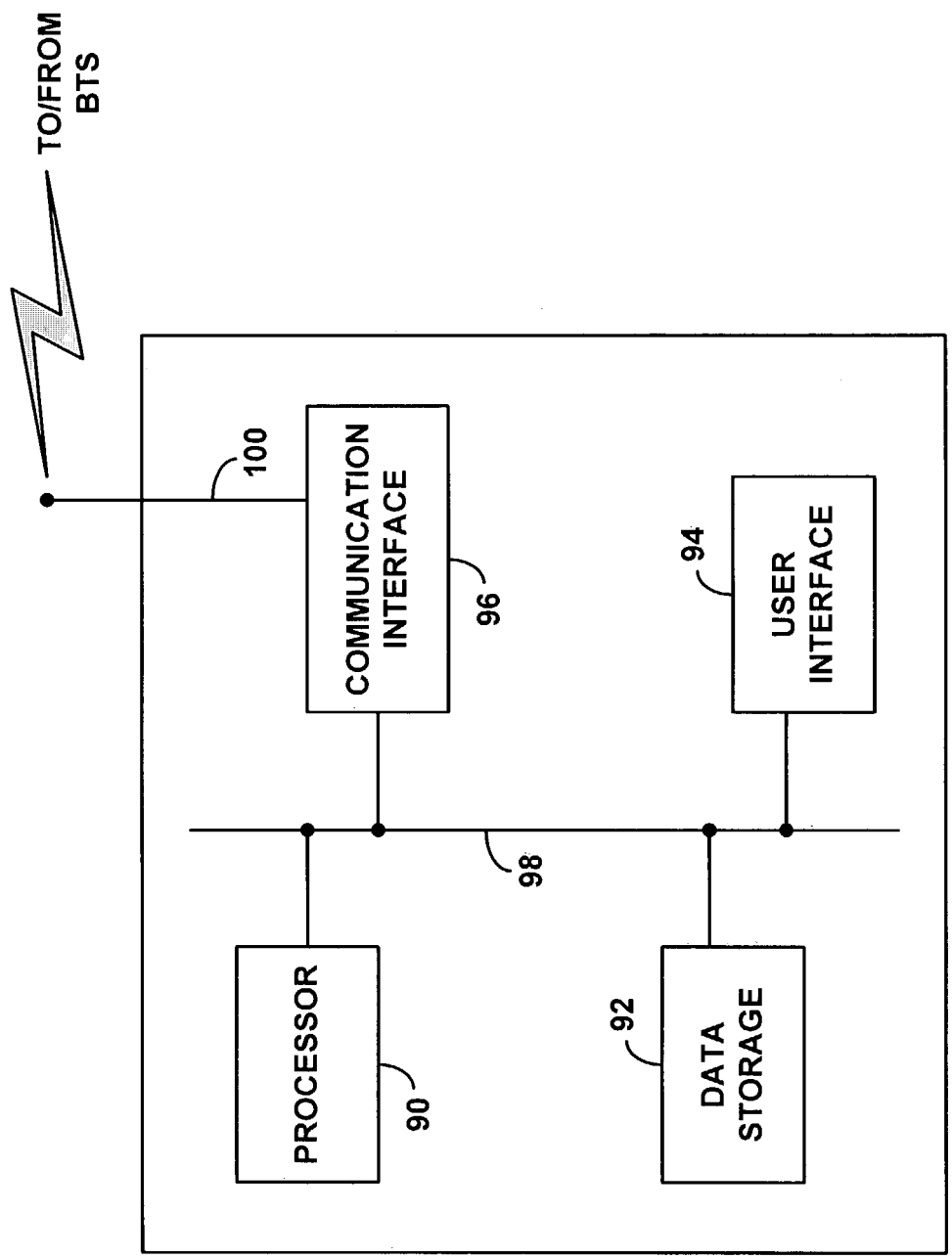
FIG. 4 is a block diagram of a mobile station operable in the arrangement of FIG. 3.

MS 52 and MS 54 may each take various forms and may be the same as or different than each other. To help illustrate, FIG. 4 is a simplified block diagram depicting an exemplary mobile station. As shown in FIG. 4, the exemplary mobile station includes a processor 90, data storage 92, a user interface 94, and a wireless communication interface 96, all of which may be coupled together by a system bus or other mechanism 98.

Each of these components may take various forms, the particular details of which are not necessarily critical. For instance, processor 90 may be general purpose microprocessor (e.g., an Intel Pentium class processor) or a dedicated processor, either of which could integrate part or all of data storage 92. And data storage 92 may be volatile and/or non-volatile storage (such as flash memory and/or a storage drive).

User interface 94 may facilitate interaction with a user. As such, the user interface may include media input and output mechanisms. To facilitate voice communications, for instance, these mechanisms might include a microphone (not shown) for receiving analog speech signals from a user, and a speaker (not shown) for playing out analog speech signals to a user. (Further, the mobile station will likely include digital/analog conversion circuitry (not shown) for converting-between analog media signals and digital representations of those signals.)

In addition, the user interface 94 may include a display, speaker or other mechanism (not shown) for presenting information and menus to a user, as well as an input mechanism (e.g., keyboard, keypad, microphone, mouse, and/or touch-sensitive display overlay) (not shown) for receiving input from a user. For PTT functionality, the input mechanism may also include a PTT button (not shown) or other mechanism that a user can readily engage in order to initiate PTT communication.

Wireless communication interface 96, in turn, may facilitate communication over an air interface with a respective base station, in compliance with an air interface protocol, such as CDMA, TDMA, GSM or 802.11x for instance. As such, the wireless communication interface may comprise a dedicated chipset (not shown) coupled with an antenna 100 for sending and receiving signals over the air interface.

In the exemplary embodiment, data storage 92 holds a set of logic (e.g. computer instructions) executable by processor 90 to carry out various functions described herein. (Alternatively or additionally, the logic may be embodied in firmware and/or hardware.) Preferably, the logic defines various core functions to facilitate wireless packet-data communication and real-time media conferencing such as PTT communication, as well as supplemental logic to facilitate the enhanced functionality that will be described below.

To facilitate wireless packet data communication, for instance, the logic may function to establish a data connection automatically when the mobile station is powered on, or in response to a user request or a page signal. For instance, the logic may be arranged to generate and send a packet-data origination request into the network as described above, and to receive a traffic channel assignment from a BSC, to establish a PPP session with a PDSN, and to receive an IP address assignment to use for packet-data communications.

To facilitate real-time media conferencing, the logic may be compliant with SIP and RTP as described above with reference to the user stations in FIG. 1. For instance, in response to a user request to initiate a conference (e.g., by pressing the PTT button with the mobile station is not currently involved in a PTT session), the logic may function to send a SIP INVITE (via proxy server 82) to communication server 84, to receive a SIP 200 OK in response from the server, and to then send a SIP ACK to the server. Further, in response to a SIP INVITE from the conference server inviting the mobile station to participate in a conference, the logic may function to send a SIP 200 OK to the server and to then receive from the server a SIP ACK.

Further, the logic may facilitate sending, receiving and playing out of media signals. In this regard, for instance, the logic may function to receive media signals from a media input mechanism and to encode and packetize outgoing media signals as RTP/UDP/IP (or perhaps RTP/TCP/IP) packets for transmission via communication interface 96 and via the radio link and data link to one or more other entities on IP network 56. Similarly, the logic may function to depacketize and decode incoming media signals provided by communication interface 96 and to pass the decoded signals to one or more media output mechanisms for playout to a user.

Still further, the logic preferably facilitates interaction with a user through user interface 94. As such, the logic might define user interface scripts that can cause various data or information to be presented by user interface 54 to a user. Further, the logic may function to receive user input (such as selections made in response to the user interfaces) from user interface 94 and to respond accordingly.

In this regard, the logic might define a core PTT application with which a user can interact in order to select a target user or group with whom the user wants to engage in a PTT session, or in order to carry out other PTT related actions (such as configuring various use settings, for instance). Such an application could conventionally present a user with one or more menus or links through which a user could navigate in order to take certain actions.

For instance, the user might invoke the application and then browse to a menu that presents a list of predefined target users or groups, and the user may select one of the list entries. The user may then press the PTT button on the mobile station in order to initiate a PTT session with the selected user or group. In response, as noted above, the logic could then generate and send a SIP INVITE seeking to set up the requested PTT session.

Each BTS, BSC, MSC, and PDSN shown in FIG. 3 can largely be a conventional component of a radio access network, such as may be provided by Sprint PCS for instance. Therefore, these components are not described here in detail. (As examples, each BTS can be a Motorola SC4812, SC611, SC614 or SC4850, each BSC can be a Nortel BSS or a Motorola CBSC, each MSC can be Lucent 5ESS, and each PDSN can be a Nortel Shasta 5000 or a CommWorks Total Control 1000. Other examples are also possible.)

In turn, proxy server 82, communication server 84 and group data store 86 can also take various forms. For example, proxy server 42 can comprise a SIP proxy server application running on a computer at a defined IP address on network 56. As such, the computer could function strictly as a SIP proxy server, or it could be a more complex platform (e.g., "service agent") that manages all packet-data communications involving mobile stations.

Group data store 86 can hold data reflecting PTT groups and PTT users. For instance, the group data store 86 can include a listing of PTT groups and, for each group, could identify users who are members of the group. Each user could be identified by a SIP address or by another identifier such as a MIN (mobile identification number) of the user's mobile station. Further, the group data store 86 can include data that correlates user/station identifiers with SIP addresses, for use in determining SIP addresses of target users.

Figure 5:
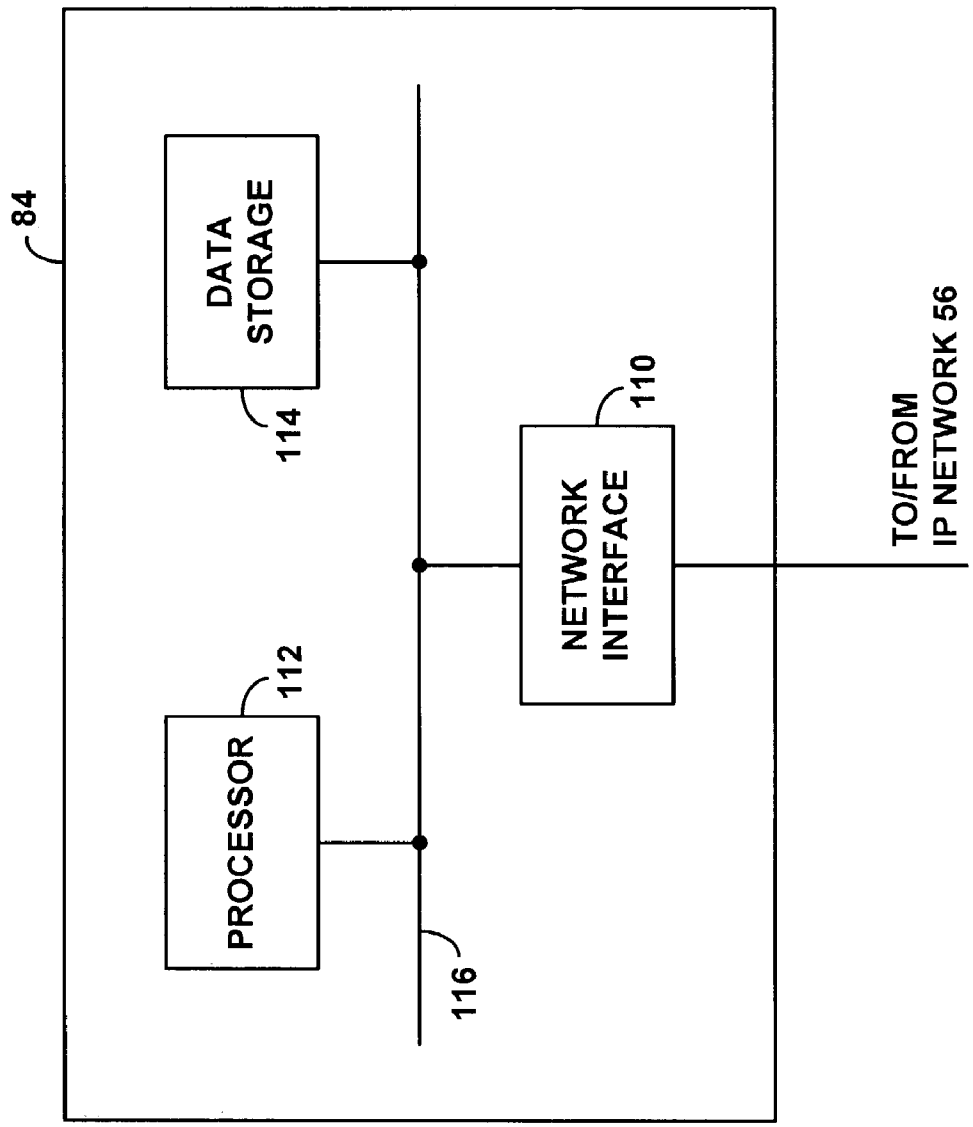
FIG. 5 is a block diagram of a communication server operable in the arrangement of FIG. 3.

Communication server 84, in turn, may comprise a conference server that also sits at a defined address on IP network 56. Referring to FIG. 5, a generalized block diagram of a representative server 84 is shown. As illustrated, exemplary server 84 includes a network interface unit 110, a processor 112, and data storage 114, all tied together via a system bus, network or other mechanism 116.

Network interface unit 110 functions to provide connectivity with IP network 56. As such, network interface unit 110 may receive packets from the IP network and may route packets independently over the IP network to designated IP addresses. A suitable network interface unit is Ethernet card, but other examples are also possible.

Data storage 114 then preferably holds machine language instructions and/or other logic executable by processor 112 to carry out various functions described herein. (Alternatively or additionally, some such functions could be carried out by hardware and/or firmware). As such, the logic may define various functions to facilitate network communication and media conferencing such as PTT communication.

For example, the logic may function to set up, tear down and bridge conference sessions between client stations such as MS 52 and MS 54. As such, the logic could define a SIP client application to engage in signaling with each client station, and an RTP application to facilitate receiving and sending RTP media streams.

Thus, in practice, the logic could operate to receive from an initiating mobile station a SIP INVITE that identifies a target user or group, to query group data store 86 to determine a SIP address of each target user, and to engage in further SIP signaling with the initiating station and with each target user's station so as to set up an RTP conference leg with each user. The logic may then function to bridge those legs together, in order to allow the users to communicate with each other.

3. Predictive Reservation of Data Connection

According to the exemplary embodiment, the latency that occurs in setting up a packet-based real-time media session can be reduced by having an initiating station reserve a data connection before a user actually requests the station to initiate the session, but in response to a triggering event that suggests a user is likely to do so. The exemplary embodiment will be described here in terms of a mobile station that would need to have a radio link and data link in order to engage in packet-data communication. However, the exemplary embodiment could equally apply in other scenarios, such as with different types of stations and with different types of data connections.

In accordance with the exemplary embodiment, a mobile station can be arranged (i) to detect a triggering event that indicates a user is likely to soon request initiation of a real-time media session, and (ii) to respond to the triggering event by acquiring or maintaining (e.g., beginning to acquire or maintain) a data connection. Thereafter, if and when the user actually requests the mobile station to initiate a real-time media session, the mobile station will already have a data connection or will already be in the process of acquiring a data connection. Consequently, the latency that arises from acquiring a data connection at the initiating can be substantially reduced.

As presently contemplated, the triggering event can be the mere act of user interaction with a real-time media application on the mobile station, without the user actually requesting initiation of a real-time media session. Preferably, the real-time media application is a program application with which a user could interact in order to configure a real-time media session, such as by selecting a target user or group or by setting one or more conferencing preferences. Because a user would logically interact with such an application before actually requesting session initiation, the act of interacting with the application is deemed to indicate that the user is likely to initiate a real-time media session.

In a PTT system as described above, for instance, the real-time media application can be a PTT application with which a user can interact in order to select a target user or group with whom the user wants to engage in a PTT session, or in order to carry out other PTT related actions, such as configuring various use settings. As further described above, such an application could present menus through which a user could navigate, one of which might present the user with a list of predefined target users or groups.

In this regard, the triggering event could be general user-interaction with the real-time media application, such as the mere act of the user invoking (running) the application on the mobile station. For instance, the triggering event could be the user selecting the real-time media application from a main program menu on the mobile station, thereby causing the mobile station to run the real-time media application.

Alternatively, the triggering event could be specific user-interaction with the real-time media application, such as user interaction with a particular aspect of the real-time media application. For example, the triggering event could be the user entering into a menu within the application that lists predefined target users or groups, or the user browsing or otherwise scrolling through such a menu. As another example, the triggering event could be the user selecting a particular target user or group from such a menu, but still before the user actually requests initiation of a session with that target user or group. And as still another example, the triggering event could be the user entering into an options screen within the application, at which the user can set real-time media conferencing parameters in anticipation of initiating a session.

In the exemplary embodiment, once the mobile station detects such a triggering event, the mobile station will take action to reserve or maintain a data connection comprising a radio link and data link. The action that the mobile station takes to do this can depend on the current state of the mobile station, that is, whether the mobile station is idle (has no radio link or data link), dormant (has a data link but no radio link) or active (has both a data link and radio link).

If the mobile station is currently idle, then the mobile station will work to acquire both a radio link and a data link. In a cdma2000 system as described above, for instance, the mobile station can do this by sending a packet-data origination request into the radio access network. In response, a BSC would assign a radio link traffic channel for use by the mobile station, and a PDSN would provide the mobile station with a data link and a mobile IP address.

If the mobile station is currently dormant, then the mobile station will work to acquire a radio link. To do this, the mobile station may simply seek to transmit any sort of packet data (e.g., an empty IP packet or a ping request) into the network, which, as noted above, would cause the mobile station to request and acquire a traffic channel. In particular, when the mobile station seeks to send such packet data, it would send a packet-data origination request into the network, to which the BSC would respond by assigning a traffic channel and alerting the PDSN that the mobile station has become active. Alternatively, the mobile station could just send such a packet-data origination request without then actually transmitting any packet data into the network.

If the mobile station is currently active, then the mobile station need not acquire a data connection. Instead, the mobile station would preferably begin maintaining its current data connection, i.e., taking action to avoid having the network release its radio link at least for a period of time. To do so, the mobile station may periodically transmit any sort of packet data into the network as a keep alive signal, at a period shorter than the active-to-dormant time period imposed by the radio access network. For instance, if the active-to-dormant time period is 10 seconds, then the mobile station could transmit packet data into the network at a period less than 10 seconds.

In the exemplary embodiment, once the mobile station has reserved a data connection, the mobile station may then maintain the data connection for a predetermined period of time, such as 20 or 30 seconds for instance. To do so, as described in the preceding paragraph, the mobile station may periodically transmit packet data as a keep alive signal, at a period shorter than the active-to-dormant time period. Further, the mobile station may again maintain the data connection in response another occurrence of a triggering event as described above.

Figure 6:
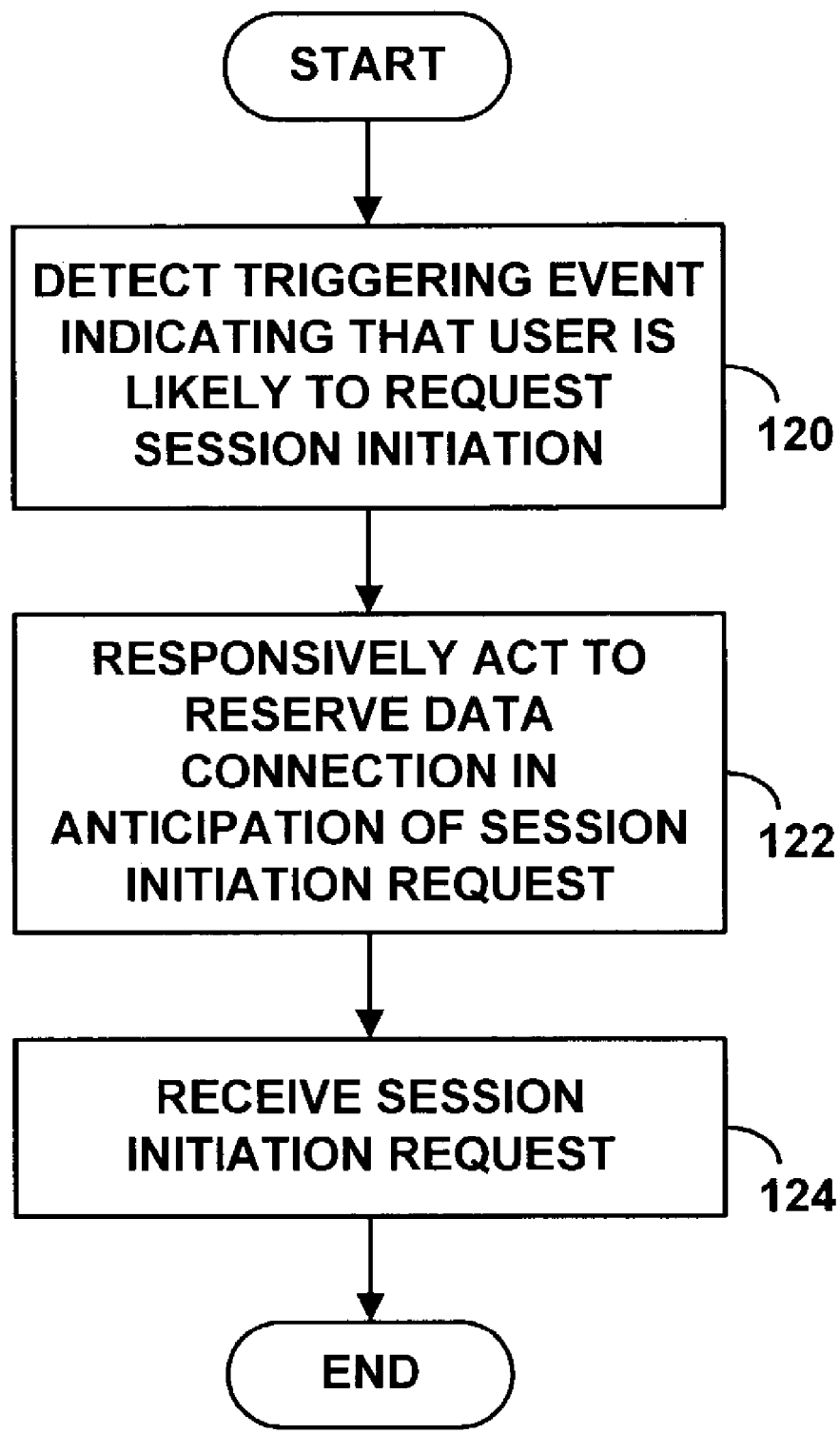
FIG. 6 is a flow chart depicting functions that could be carried out in accordance with the exemplary embodiment.

To implement this latency-reducing process, a mobile station such as that shown in FIG. 4 can include supplemental program logic in data storage 92, which can be executed by processor 90. FIG. 6 is a flow chart generally summarizing the functions that processor 90 could thereby carry out.

As shown in FIG. 6, at block 120, the processor would first detect a triggering event such as that described above, indicating that a user is likely to soon request initiation of a real-time media session. At block 122, the processor would then responsively take action to reserve a data connection in anticipation of the user requesting session initiation. And at block 124, the processor would thereafter receive a request from a user to initiate a session. The processor may then engage in SIP signaling and data communication via the data connection.

4. Conclusion

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method comprising:
before a user requests initiation of a real-time media session, a client station detecting a triggering event that indicates the user is likely to soon request initiation of the real-time media session, wherein the client station includes a real-time media application with which the user can interact in order to configure the real-time media session; and
in response to the triggering event, the client station reserving a data connection for use in setting up and engaging in the real-time media session, wherein the triggering event comprises the user interacting with the real-time media application.

2. The method of claim 1, further comprising:
after detecting the triggering event, the client station receiving a user request to initiate the real-time media session; and
in response to the user-request, the client station sending a session initiation message via the data connection to a communication server on a packet-switched network.

3. The method of claim 1, wherein the triggering event comprises the user invoking the real-time media application.

4. The method of claim 1, wherein the real-time media application presents a menu of possible targets with which to establish a real-time media session, and wherein the user interacting with the real-time media application comprises the user opening the menu.

5. The method of claim 1, wherein the real-time media application presents a menu of possible targets with which to establish a real-time media session, and wherein the user interacting with the real-time media application comprises the user scrolling through the menu.

6. The method of claim 1, wherein the real-time media application presents a menu of possible targets with which to establish a real-time media session, and wherein the user interacting with the real-time media application comprises the user selecting a target from the menu.

7. The method of claim 1, wherein the real-time media application comprises a push-to-talk application.

8. The method of claim 1, wherein reserving a data connection for use in setting up and engaging in the real-time media session comprises:
reserving a radio link layer connection.

9. The method of claim 1, wherein reserving a data connection for use in setting up and engaging in the real-time media session comprises:
reserving a data-link layer connection.

10. The method of claim 1, wherein reserving a data connection for use in setting up and engaging in the real-time media session comprises:
setting up the data connection.

11. The method of claim 1, wherein reserving a data connection for use in setting up and engaging in the real-time media session comprises:
maintaining the data connection.

12. The method of claim 11, wherein maintaining the data connection comprises sending keepalive signals.

13. The method of claim 12, wherein the keepalive signals comprise packet-data.

14. The method of claim 12,
wherein the client station is a mobile station served by a radio access network, wherein the radio access assigns a radio link over which the mobile station can communicate, and wherein the radio access network is arranged to release the radio link after a predefined period of time during which no packet-data flows to or from the mobile station; and
wherein sending keepalive signals comprises periodically sending packet-data into the radio access network at a period that is shorter than the predefined period, so as to maintain the radio link.

15. A client station comprising:
a real-time media application with which the user can interact in order to configure a real-time media session;
means for detecting a triggering event that indicates the user is likely to soon request initiation of a real-time media session, before the user requests initiation of the real-time media session, wherein the triggering event comprises the user interacting with the real-time media session;
means for responding to the triggering event by reserving a data connection for use in setting up and engaging in the real-time media session.

16. A client station comprising:
a processor;
data storage;

a real-time media application stored in the data storage and executable by the processor to allow a user to configure a real-time media session;

connection-reservation logic stored in the data storage and executable by the processor to detect user interaction with the real-time media application before the user requests initiation of the real-time media session, and to responsively reserve a data connection over which to set up and engage in the real-time media session;

a session-initiation button that can be actuated by a user to request initiation of the real-time media session; and session-initiation logic stored in the data storage and executable by the processor in response to user actuation of the session-initiation button, to send a session initiation message via the data connection to a communication server on a packet-switched network.

17. The client station of claim 16, further comprising a wireless communication interface for engaging in wireless communications.

18. A method of reserving a communication link for a real-time media session, the method comprising:

detecting a predetermined trigger, the predetermined trigger comprising user activity that indicates that a user may initiate a real-time media session;

in response to the predetermined trigger, establishing a communication link over an air interface; and with said communication link already established, receiving a request from the user to initiate the real-time media session.

19. The method of claim 18, wherein establishing a communication link comprises:

establishing a radio link.

20. The method of claim 19, wherein establishing a communication link comprises:

establishing a data link.

21. The method of claim 19, wherein establishing a radio link comprises:

obtaining a traffic channel assignment.

22. The method of claim 21, further comprising:

maintaining the communication link for a predetermined period of time.

23. The method of claim 22, wherein maintaining the communication link comprises:

periodically transmitting data to maintain the traffic channel assignment.

24. A mobile station comprising:

a processor;

data storage; and machine language instructions stored in the data storage and executable by the processor for:

(a) detecting a predetermined trigger, the predetermined trigger comprising user activity that indicates that a user of the mobile station may initiate a real-time media session, (b) when the predetermined trigger is detected, establishing a communication link over an air interface, (c) receiving a user request to initiate a real-time media session, and (d) in response to the user-request, initiating a real-time media session with the communication link already established.

* * * * *